(12) United States Patent
Lee

(10) Patent No.: US 7,018,706 B2
(45) Date of Patent: Mar. 28, 2006

(54) STATIC-ELECTRICITY TILE

(76) Inventor: Moon Soo Lee, 103-606 Gaebong Hanjin Apt., 478 Gaebong-dong, Gooro-gu, Seoul-shi (KR)

(*) Notice: Subject to any disclaimer, the term of this patent is extended or adjusted under 35 U.S.C. 154(b) by 35 days.

(21) Appl. No.: 10/250,358

(22) PCT Filed: May 13, 2003

(86) PCT No.: PCT/KR03/00941

§ 371 (c)(1),
(2), (4) Date: Jul. 1, 2003

(87) PCT Pub. No.: WO03/099551

PCT Pub. Date: Dec. 4, 2003

(65) Prior Publication Data

US 2004/0241449 A1 Dec. 2, 2004

(30) Foreign Application Priority Data

May 27, 2002 (KR) ........................ 10-2002-0029152

(51) Int. Cl.
*B32B 7/02* (2006.01)

(52) U.S. Cl. .................... 428/216; 428/49; 428/408; 428/472

(58) Field of Classification Search .............. 428/49, 428/216, 408, 472; 381/188
See application file for complete search history.

(56) References Cited

U.S. PATENT DOCUMENTS

| | | | | |
|---|---|---|---|---|
| 4,084,031 A | * | 4/1978 | Barsy | 428/96 |
| 4,301,040 A | * | 11/1981 | Berbeco | 428/317.9 |
| 4,521,553 A | * | 6/1985 | Fitton et al. | 523/333 |
| 4,540,624 A | * | 9/1985 | Cannady, Jr. | 428/408 |
| 4,724,187 A | * | 2/1988 | Ungar et al. | 428/408 |
| 4,770,916 A | * | 9/1988 | Leukel et al. | 428/95 |
| 5,122,404 A | * | 6/1992 | Fowler | 428/87 |
| 5,160,775 A | * | 11/1992 | Yamada | 428/198 |
| 2003/0136494 A1 | * | 7/2003 | Windmoller et al. | 428/323 |

FOREIGN PATENT DOCUMENTS

| | | | |
|---|---|---|---|
| DE | 3323461 | * | 8/1984 |
| EP | 0248237 | * | 12/1987 |
| JP | 51133797 | * | 10/1976 |
| JP | 02122928 | * | 5/1990 |

* cited by examiner

*Primary Examiner*—Archene Turner (57) ABSTRACT

Disclosed is a static-proof tile utilizing carbon. The static-proof tile comprises: a tile substrate made from synthetic resin; a color-printed film made from synthetic resin and attached to an upper surface of the tile substrate; a transparent film made from synthetic resin and attached to an upper surface of the color-printed film; and a carbon film disposed between the tile substrate and the color-printed film, the carbon film having a thickness smaller than that of the tile substrate. The static-proof tile has a high surface stiffness, can prevent the carbon from being detached from a surface thereof, has a uniform static-proof effect, can be manufactured at a small cost, and can shield electromagnetic waves and water vein waves.

22 Claims, 6 Drawing Sheets

STATIC-ELECTRICITY TILE

BACKGROUND OF THE INVENTION

1. Field of the Invention

The present invention relates to a static-proof tile, and more particularly to a static-proof tile employing a carbon film. Static-proof tiles according to the present invention may be laid on floors upon which electric or electronic appliances such as semiconductor devices are assembled, floors of laboratories, cleaning rooms, and operating rooms of a hospital, floors of offices which are apt to be influenced by harmful electromagnetic waves, etc., to absorb or drain static electricity.

2. Description of the Related Art

There exist various conventional static-proof tiles (which are also called "static-proof mats" or "static-proof sheets" and will be referred to simply as "static-proof tiles" hereinafter).

In manufacturing the conventional static-proof tiles, powders of conductive metals, such as copper, gold, and silver, may be applied onto or permeated into surfaces of the tiles, or a surface active agent may be mixed in the tiles while the tiles are formed, or carbon may be inputted to and mixed with materials of synthetic resin or rubber before the tiles are completed.

From among the conventional static-proof tiles, the present invention relates to a static-proof tile manufactured by utilizing carbon.

The conventional static-proof tiles utilizing carbon include not only typical carbon tiles, which are manufactured by rolling tile preforms which are mixtures of carbon and synthetic resin, but also special carbon tiles such as those disclosed by Korean Registered Utility Model No. 1987-2585 and Korean Utility Model Laid-Open No. 97-732.

Korean Registered Utility Model No. 1987-2585 employs a method, in which a mat is formed by coating a carbon layer on a surface of each granule made from synthetic resin and then compressing the coated granules in a mold, so as to reduce the quantity of added carbon. Korean Utility Model Laid-Open No. 97-732 is an improvement of Korean Registered Utility Model No. 1987-2585 and provides a static-proof tile manufactured by a method, in which a conductive tile manufactured by the method according to Korean Registered Utility Model No. 1987-2585 is sliced into pieces having a thickness of about 1 mm, an intermediate layer is attached to a lower surface of each piece, a soft rubber sheet is attached to a lower surface of the intermediate layer, and then the three layers are fused to each other by heat.

However, the conventional conductive tiles or static-proof tiles utilizing carbon have the following problems which require solution.

SUMMARY OF THE INVENTION

First, in the case of the conductive tile manufactured by mixing carbon in advance with synthetic resin, the completed tile has a very soft surface which makes it difficult to employ the completed tile as a floor plate. In particular, this conductive tile may be dug or scratched by soles of shoes, etc., and is thus improper as a floor plate.

Second, when a surface of the conductive tile manufactured according to the conventional method in which carbon is mixed in advance with synthetic resin is rubbed by another object, the rubbing object may be smeared and thus contaminated by the carbon.

Third, the static-proof tile manufactured by coating a carbon layer on a surface of each granule and then compressing the coated granules inevitably has portions with discontinuities, so that static electricity may be generated in the static-proof tile.

Fourth, the conventional methods include complicated manufacturing steps, such as a step of coating granules made from synthetic resin, thereby requiring a large manufacturing cost.

Fifth, hardly any tiles have been developed, which not only can prevent generation of static electricity but also can shield electromagnetic waves and water vein waves.

Therefore, the present invention has been made in order to overcome the above-mentioned problems of the prior art, and it is a first object of the present invention to provide a static-proof tile utilizing carbon, which has a large surface stiffness, from a surface of which the carbon is not smeared onto an object rubbing the surface, which has a uniform static-proof effect, and which can be manufactured at a small cost.

It is a second object of the present invention to provide a static-proof tile utilizing carbon, which can decrease static electricity and shield electromagnetic waves and water vein waves.

DISCLOSURE OF THE INVENTION

According to an aspect of the present invention, there is provided a static-proof tile comprising: a tile substrate made from synthetic resin; a color-printed film made from synthetic resin and attached to an upper surface of the tile substrate; a transparent film made from synthetic resin and attached to an upper surface of the color-printed film; and a carbon film disposed between the tile substrate and the color-printed film, the carbon film having a thickness smaller than that of the tile substrate.

It is preferred that another carbon film is attached to a lower surface of the tile substrate.

According to another aspect of the present invention, there is provided a static-proof tile comprising: a tile substrate made from synthetic resin; a color-printed film made from synthetic resin and attached to an upper surface of the tile substrate; a transparent film made from synthetic resin and attached to an upper surface of the color-printed film; and a metal sheet attached to a lower surface of the tile substrate, the metal sheet having a thickness smaller than that of the tile substrate, the metal sheet containing or being coated with metal.

It is preferred that the metal sheet has at least one carbon coat coated on one surface or both surfaces of the metal sheet, the carbon coat having a thickness smaller than that of the tile substrate.

According to still another aspect of the present invention, there is provided a static-proof tile comprising: a tile substrate made from synthetic resin; a color-printed film made from synthetic resin and attached to an upper surface of the tile substrate; a transparent film made from synthetic resin and attached to an upper surface of the color-printed film; and a carbon coat formed on a lower surface of the color-printed film by printing or coating carbon thereon.

In the case in which a carbon coat is formed on a lower surface of the color-printed film, it is also preferred that a carbon film is formed under the tile substrate, the carbon film having a thickness smaller than that of the tile substrate.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Reference will now be made in detail to the preferred embodiments of the present invention.

Figure 1A:
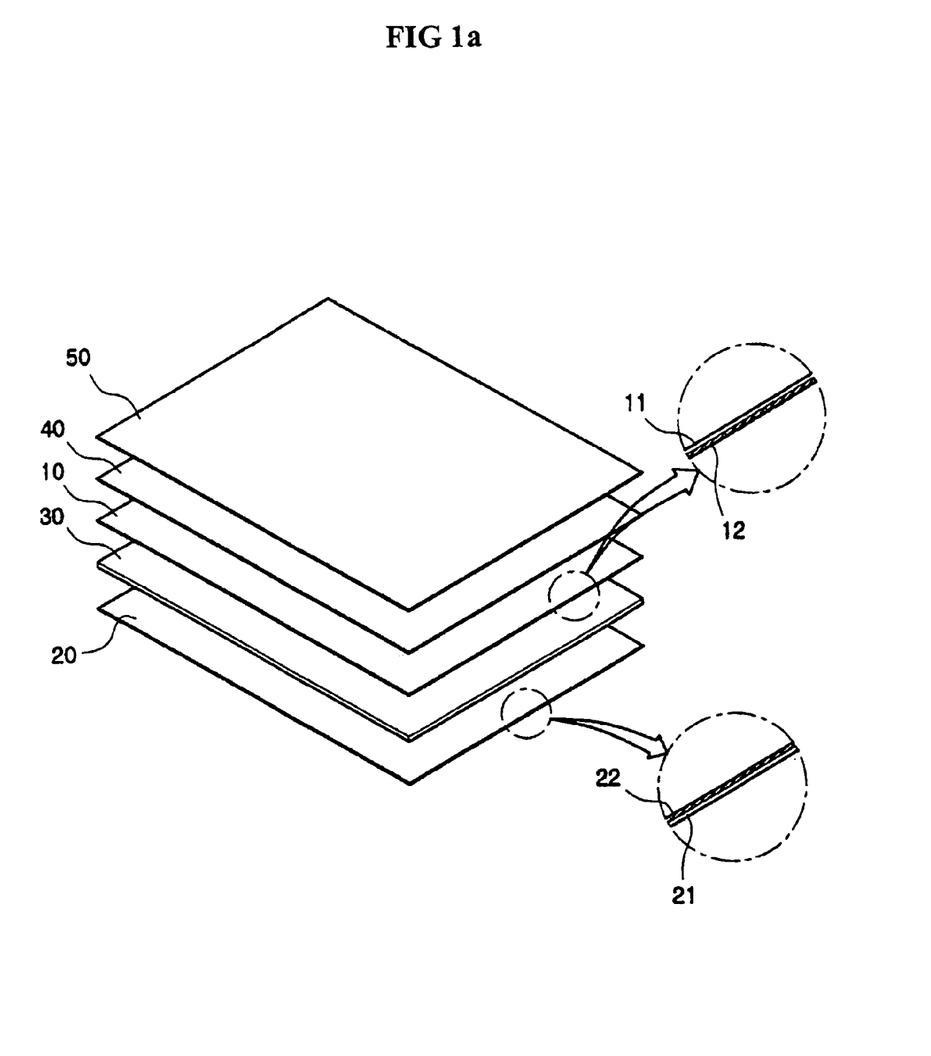
FIG. 1A is an exploded perspective view of a static-proof tile according to the first embodiment of the present invention.
Figure 1B:
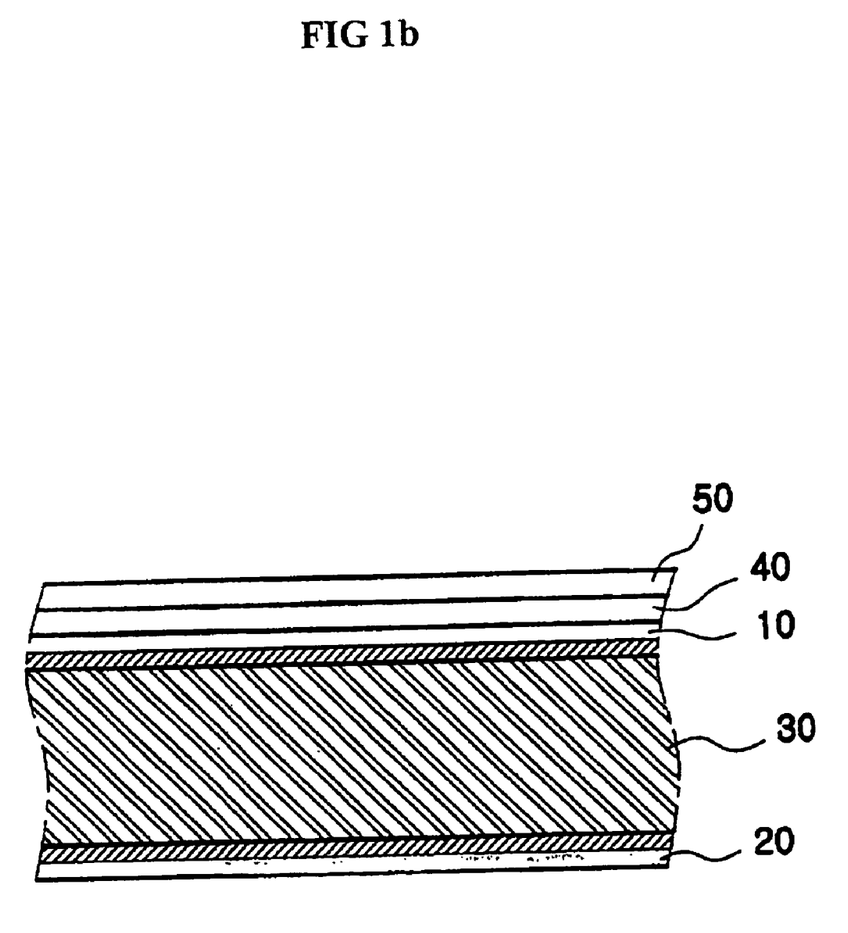
FIG. 1B is an enlarged sectional view of the static-proof tile shown in FIG. 1A, in a state in which films of the tile have been attached to each other.

FIG. 1A is an exploded perspective view of a static-proof tile according to the first embodiment of the present invention, and FIG. 1B is an enlarged sectional view of the static-proof tile shown in FIG. 1A, in a state in which films of the tile have been attached to each other.

Referring to FIG. 1A, a typical tile made from synthetic resin includes only a transparent film 50 disposed at the uppermost layer, a color-printed film 40 disposed under the transparent film 50, and a tile substrate 30 disposed under the color-printed film 40, each of which is made from non-conductive synthetic resin having an electric resistance of at least $10^{14}$ $\Omega/cm^2$. A synthetic resin tile having such a typical construction as described above can have a surface layer with a high stiffness and allows various colors or shapes to be printed in its color-printed film, thereby having an excellent marketability. However, this typical tile is disadvantageous in that it has no ability to prevent generation of static electricity. The present invention provides a tile which has an excellent static-proof effect as well as having all the characteristics of the typical tile having the construction described above.

That is, a static-proof tile according to the present invention is characterized in that at least one thin electro-conductive layer utilizing carbon is formed under a transparent film 50 which is located at the uppermost layer and made from non-conductive material. This construction enables realization of a static-proof tile which has a large surface stiffness and can prevent the carbon from being detached from the tile.

Referring again to FIGS. 1A and 1B, a conductive or static-proof tile includes a transparent film 50 located at the uppermost layer, a color-printed film 40 located directly under the transparent film 50, a first carbon film 10 located directly under the color-printed film 40, a tile substrate 30 located directly under the first carbon film 10, and a second carbon film 20 located directly under the tile substrate 30.

Herein, it is preferred that, the transparent film 50 has a thickness of about 0.3 mm, the color-printed film 40 has a thickness of about 0.1 mm, each of the first and second carbon films 10 and 20 has a thickness of about 0.1 mm, and the tile substrate 30 has a thickness of about 2.4 mm, so that the entire tile has a thickness of about 3 mm. Those films described the above are formed integrally with each other by heating and rolling them to each other by means of a hot roller.

It is preferred that each of the first and second carbon films 10 and 20 includes a synthetic resin film 11 or 21 and a carbon coat 12 or 22 formed by coating or printing carbon on one surface or both surfaces of the synthetic resin film 11 or 21. FIG. 1A shows examples of carbon coats each of which is formed on only one surface of each of the synthetic resin film.

The construction described above enables a static-proof tile utilizing carbon to have a uniform static-proof effect and to be manufactured by a simple process and small cost.

As the carbon film described above, an electro-conductive film formed by heating and compressing a synthetic resin material containing carbon may be employed. The carbon film formed in this way is advantageous in the aspect of its effect but is disadvantageous in the aspect of its manufacturing cost.

At least one of the tile substrate 30 and the color-printed film 40 may further contain a surface active agent. This construction is suitable for a tile to be used in a place in which static electricity is frequently generated or a large quantity of static electricity is generated.

In a tile used in an environment in which there is not generated so much static electricity, the second carbon film 20 directly under the tile substrate 30 may be omitted.

It has been confirmed that the electric resistance of the surface of the transparent film 50 decreases below $10^{13}$ $\Omega/cm^2$ due to the tunneling effect when the first carbon film 10 having a surface resistance of at most $10^6$ $\Omega/cm^2$ is attached to the lower surface of the transparent film 50 which is made from non-conductive material. In practice, it has been known that a tile has a sufficient static-proof effect when the tile has a surface resistance of $10^{13}$ $\Omega/cm^2$. For reference, an anti-static grade according to the U.S. military specifications has a range from $10^9$ $\Omega/cm^2$ to $10^{14}$ $\Omega/cm^2$.

Figure 2A:
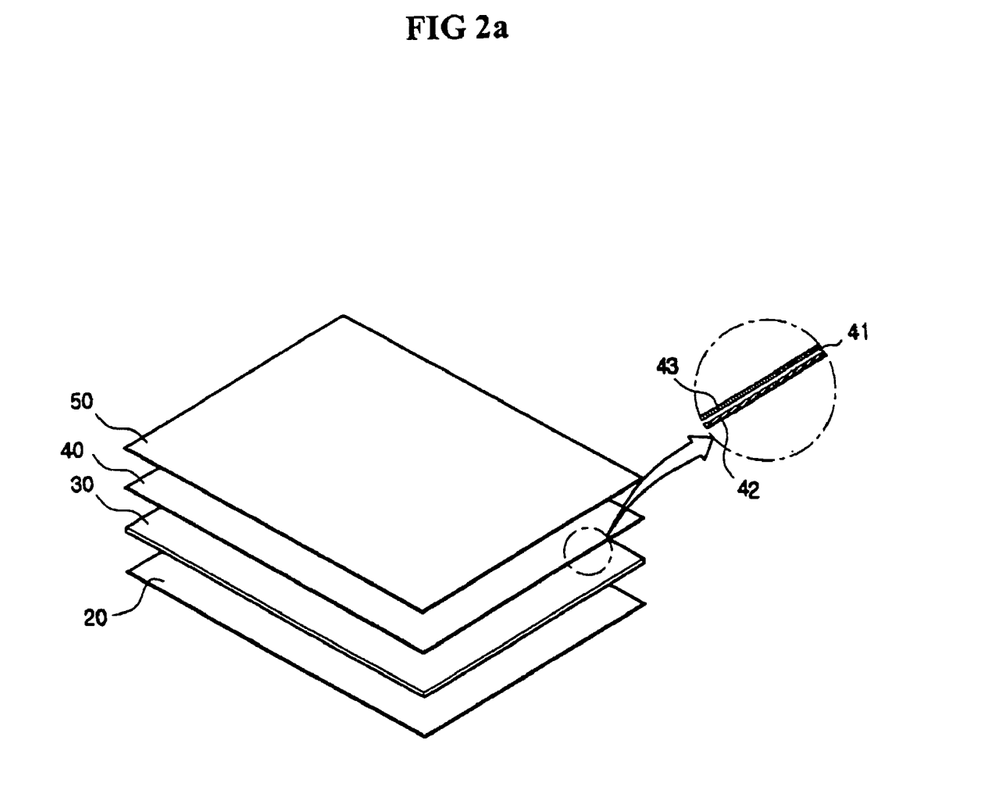
FIG. 2A is an exploded perspective view of a static-proof tile according to the second embodiment of the present invention.
Figure 2B:
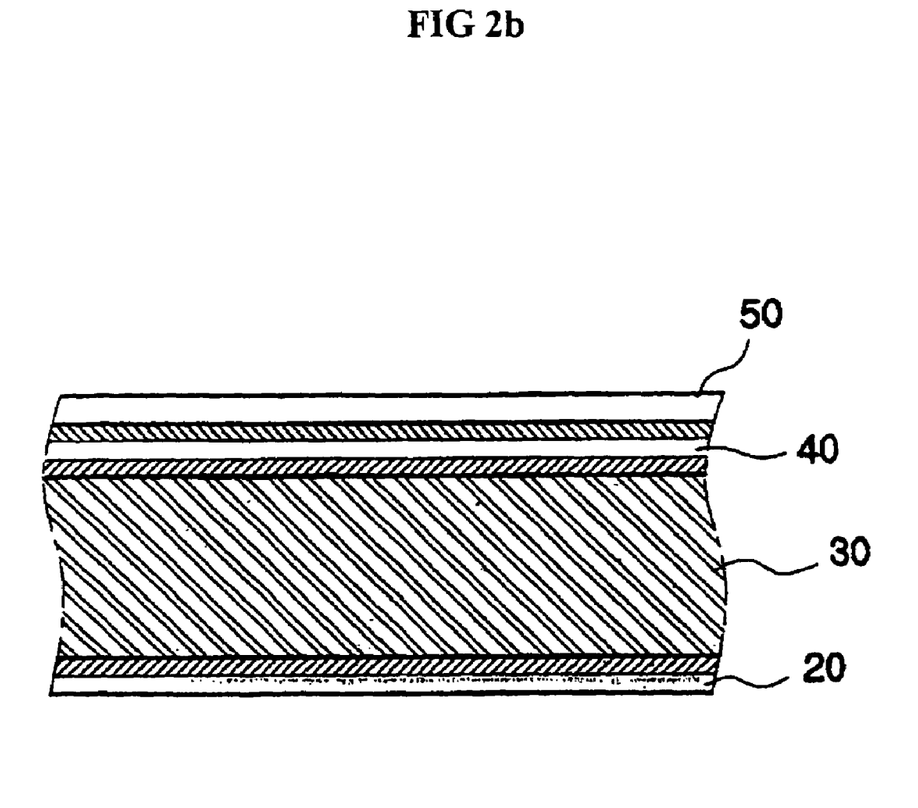
FIG. 2B is an enlarged sectional view of the static-proof tile shown in FIG. 2A, in a state in which films of the tile have been attached to each other.

FIG. 2A is an exploded perspective view of a static-proof tile according to the second embodiment of the present invention, and FIG. 2B is an enlarged sectional view of the static-proof tile shown in FIG. 2A, in a state in which films of the tile have been attached to each other.

The second embodiment is different from the first embodiment in that no separate carbon film is attached to the lower surface of the color-printed film 40 but the lower surface of the color-printed film 40 is directly coated with a carbon coat 42.

That is, a color-printed layer 43 is formed on the upper surface of a synthetic resin film 41, and the carbon coat 42 is coated on the lower surface of the synthetic resin film 41. Herein, the carbon coat may be formed by coating or printing carbon on the lower surface of the synthetic resin film 41.

The same description of the corresponding construction of the first embodiment may be given to the other construction of the second embodiment.

Figure 3A:
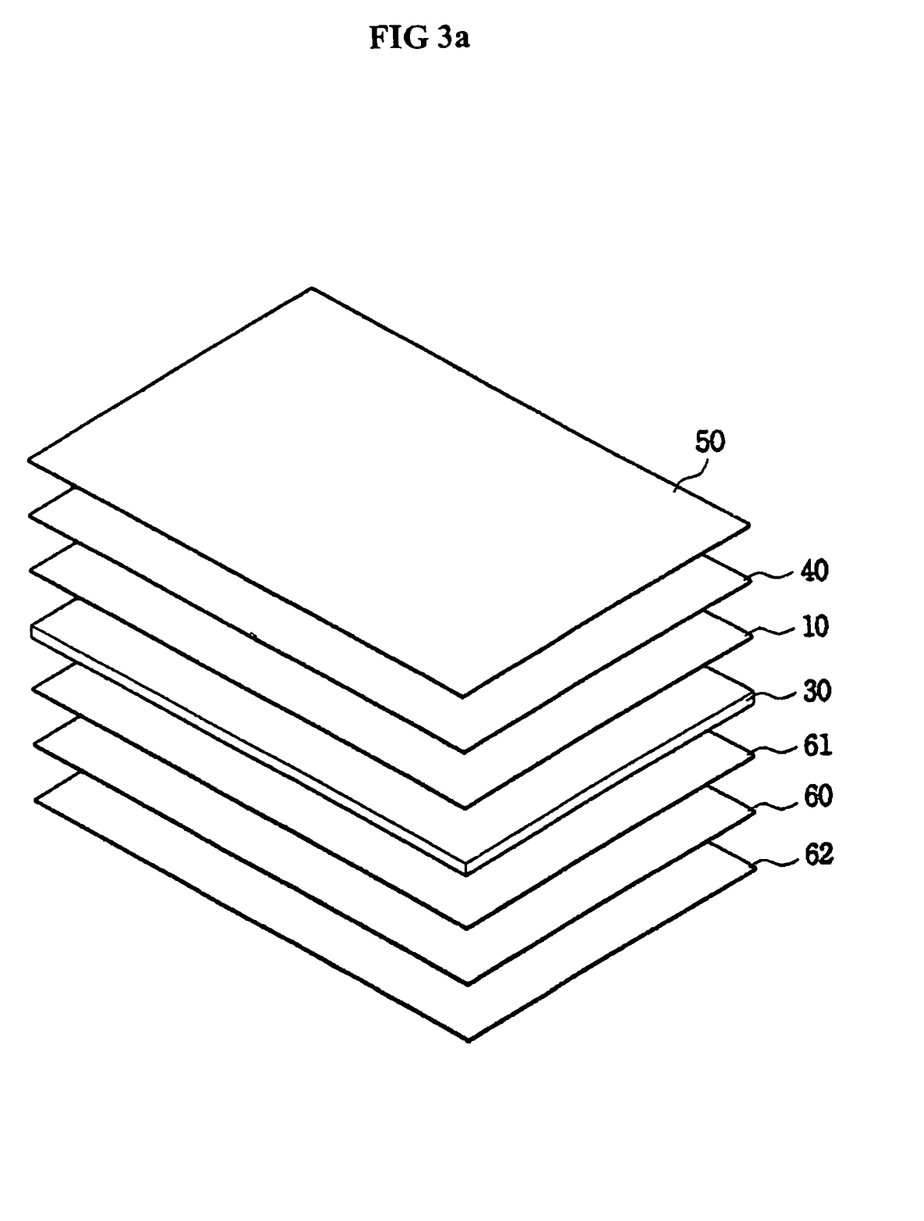
FIG. 3A is an exploded perspective view of a static-proof tile according to the third embodiment of the present invention.
Figure 3B:
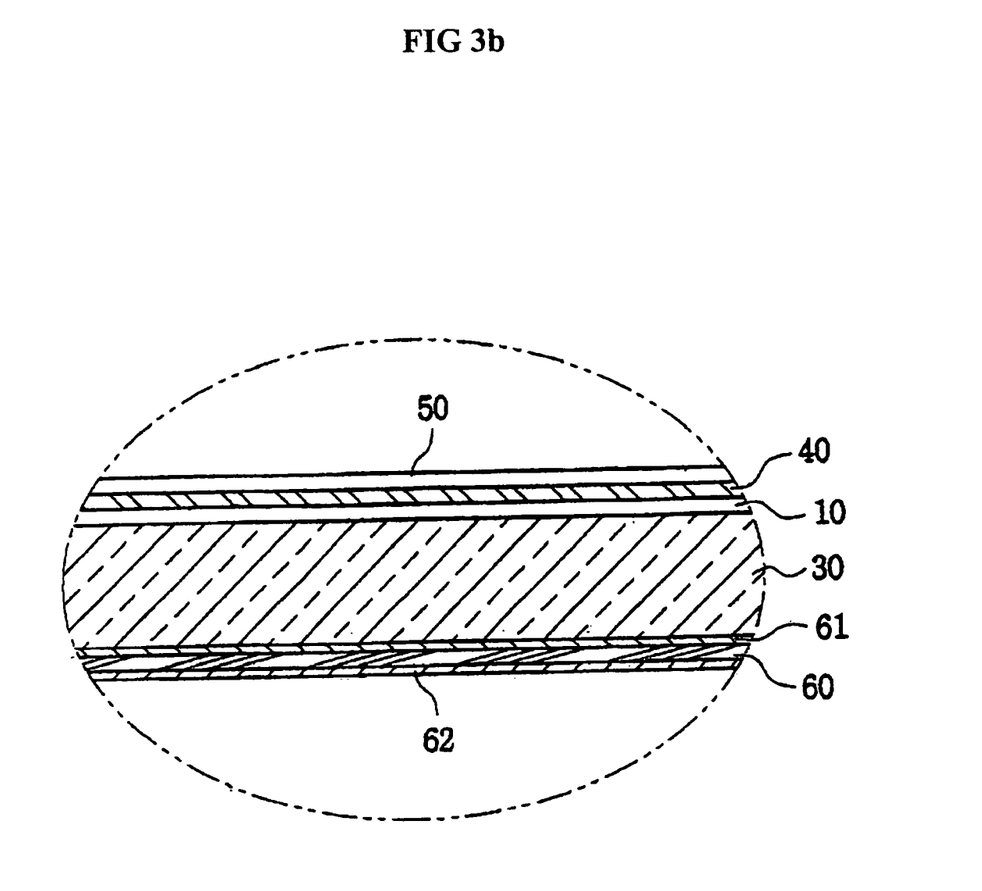
FIG. 3B is an enlarged sectional view of the static-proof tile shown in FIG. 3A, in a state in which films of the tile have been attached to each other.

FIG. 3A is an exploded perspective view of a static-proof tile according to the third embodiment of the present invention, and FIG. 3B is an enlarged sectional view of the static-proof tile shown in FIG. 3A, in a state in which the film components of the tile have been attached to each other.

The third embodiment is different from the first embodiment in that a metal sheet 60 having a thickness smaller than that of the tile substrate 30 instead of a carbon film is attached to the lower surface of the tile substrate 30.

The metal sheet 60 may be a conductive sheet, made of one of nickel, copper, silver, gold, kalium, magnesium, cadmium, aluminum, zinc, and tungsten.

The metal sheet 60 is a medium having a conductivity between $1 \times 10^7$ and $6.17 \times 10^7$ S/m, through which electricity passes well.

It has been confirmed that, when the metal sheet 60 having a surface resistance of at most $10^{12}$ $\Omega/cm^2$ is attached to the lower surface of the transparent film 50 which is a non-conductor, the electric resistance of the surface of the transparent film 50 decreases below $10^{12}$ $\Omega/cm^2$ due to a tunneling effect. Therefore, the tile according to the present invention can decrease the static electricity on the surface of the tile.

Further, the metal sheet 60 is made of metal which is non-magnetic and has a high conductivity, so that the employment of the metal sheet 60 can be very useful in shielding electromagnetic waves and low-frequency waves such as water vein waves. The water vein waves, which cannot pass through the metal sheet 60, finally change into eddy currents and are thus collected at corners of the metal sheet. Then, the metal sheet discharges the collected current to a ground, like a grounding pole. In this way, the metal sheet can shield the water vein waves as well as the electromagnetic waves.

Further, it is preferred that the metal sheet 60 is manufactured in a shape of a thin plate in consideration of the fact that the metal sheet 60 is heavier and more expensive than other conductive materials. Preferably, the metal sheet 60 may have a thickness of 0.05 to 0.1 mm.

Further, a carbon coat of 0.1 mm may be formed on one surface or both surfaces of the thin metal sheet. This carbon coat can decrease the static electricity as described in the first embodiment, and the thin metal plate can shield the electromagnetic waves and water vein waves.

Industrial Applicability

As can be seen from the foregoing, the present invention provides a static-proof tile utilizing carbon, which has a large surface stiffness, from a surface of which the carbon is not detached, which has a uniform static-proof effect, which can be manufactured at a small cost, and which can shield electromagnetic waves and water vein waves.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

What is claimed:

1. A static-proof tile comprising:
    a tile substrate made from synthetic resin;
    a color-printed film made from synthetic resin and attached to an upper surface of the tile substrate;
    a transparent film made from synthetic resin and attached to an upper surface of the color-printed film; and
    a second carbon coated film or carbon film attached to a lower surface of the tile substrate, the second carbon coated film or carbon film having a thickness smaller than that of the tile substrate.

2. A static-proof tile as claimed in claim 1, further comprising a first carbon film disposed between the tile substrate and the color-printed film, the first carbon film having a thickness smaller than that of the tile substrate.

3. A static-proof tile as claimed in claim 2, wherein the first and second carbon films are carbon-coated films, in which carbon is coated or printed on one surface or both surfaces of a synthetic resin film.

4. A static-proof tile as claimed in claim 2, wherein the first and second carbon films are electro-conductive films manufactured by heating and compressing a synthetic resin material containing carbon.

5. A static-proof tile as claimed in claim 2, wherein the first and second carbon films are carbon-coated films, in which carbon is coated or printed on one surface or both surfaces of a synthetic resin film.

6. A static-proof tile as claimed in claim 2, wherein the first and second carbon films are electro-conductive films manufactured by heating and compressing a synthetic resin material containing carbon.

7. A static-proof tile as claimed in claim 1, wherein at least one of the tile substrate and the color-printed film contains a surface active agent.

8. A static-proof tile comprising:
    a tile substrate made from synthetic resin;
    a color-printed film made from synthetic resin and attached to an upper surface of the tile substrate;
    a transparent film made from synthetic resin and attached to an upper surface of the color-printed film; and
    a metal sheet attached to a lower surface of the tile substrate, the metal sheet having a thickness smaller than that of the tile substrate, the metal sheet containing or being coated with metal.

9. A static-proof tile as claimed in claim 8, wherein the metal sheet has at least one carbon coat coated on one surface or both surfaces of the metal sheet, the carbon coat having a thickness smaller than that of the tile substrate.

10. A static-proof tile as claimed in claim 9, further comprising a carbon film disposed between the tile substrate and the color-printed film, the carbon film having a thickness smaller than that of the tile substrate.

11. A static-proof tile as claimed in claim 8, further comprising a carbon film disposed between the tile substrate and the color-printed film, the carbon film having a thickness smaller than that of the tile substrate.

12. A static-proof tile as claimed in claim 8, wherein the carbon film is a carbon-coated film, in which carbon is coated or printed on one surface or both surfaces of a synthetic resin film.

13. A static-proof tile as claimed in claim 9, wherein the carbon film is a carbon-coated film, in which carbon is coated or printed on one surface or both surfaces of a synthetic resin film.

14. A static-proof tile as claimed in claim 8, wherein at least one of the tile substrate and the color-printed film contains a surface active agent.

15. A static-proof file comprising:
    a tile substrate made from synthetic resin;
    a color-printed film made from synthetic resin and attached to an upper surface of the tile substrate;
    a transparent film made from synthetic resin and attached to an upper surface of the color-printed film;
    a carbon coating formed on a lower surface of the color-printed film by printing or coating carbon thereon; and a carbon film disposed under the tile substrate, the carbon film having a thickness smaller than that of the tile substrate.

16. A static-proof tile as claimed in claim 15, wherein the carbon film is a carbon-coated film, in which carbon is coated or printed on one surface or both surfaces of a synthetic resin film.

17. A static-proof tile as claimed in claim 16, wherein the tile substrate contains a surface active agent.

18. A static-proof tile as claimed in claim 15, wherein the carbon film is an electro-conductive film manufactured by heating and compressing a synthetic resin material containing carbon.

19. A static-proof tile as claimed in claim 18, wherein the tile substrate contains a surface active agent.

20. A static-proof tile as claimed in claim 15, wherein the tile substrate contains a surface active agent.

21. A static-proof tile as claimed in claim 15, wherein the carbon film is an electro-conductive film manufactured by heating and compressing a synthetic resin material containing carbon.

22. A static-proof tile as claimed in claim 15, wherein the tile substrate contains a surface active agent.

* * * * *